Nov. 24, 1964 W. PRENTICE 3,158,270
STOOKER FOR TRAVELING BALER
Filed May 15, 1962 4 Sheets-Sheet 3
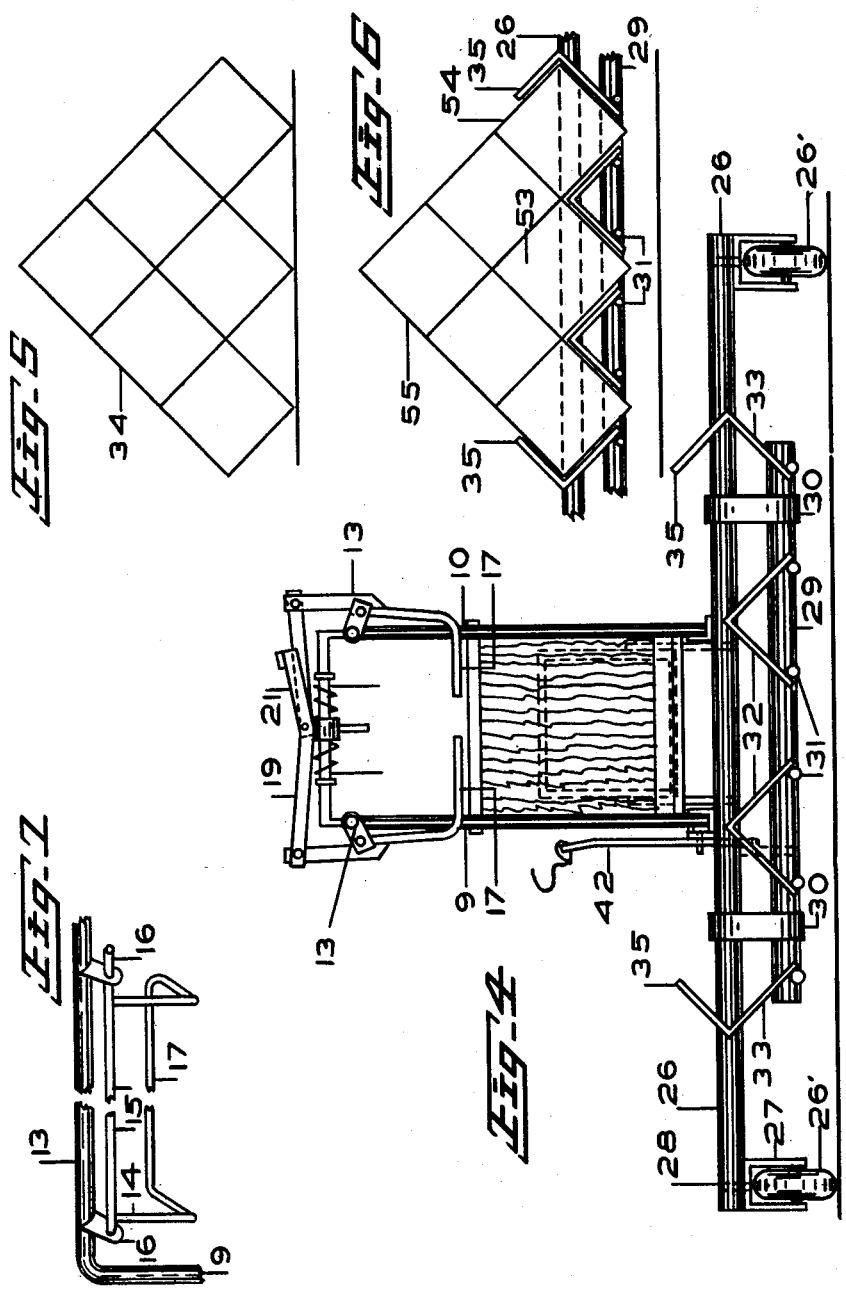

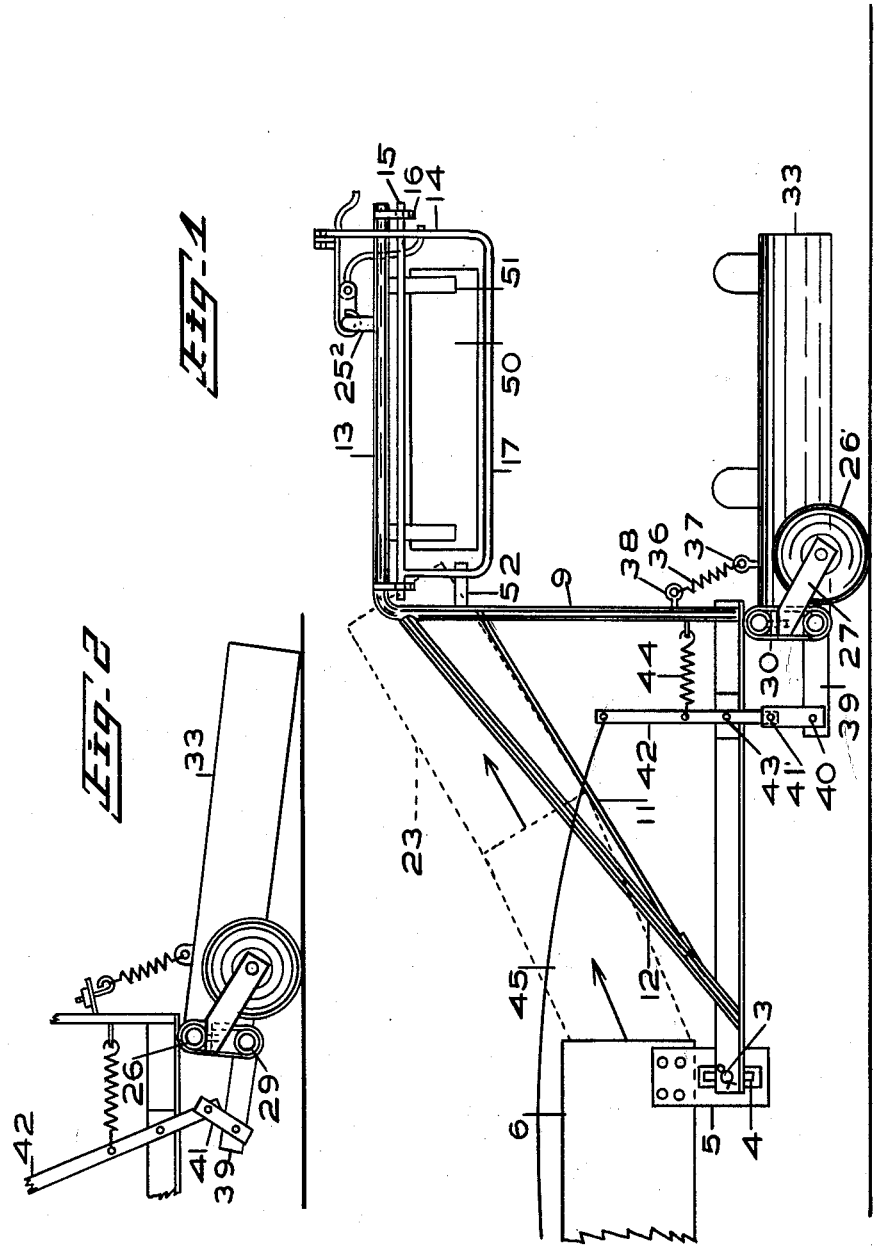

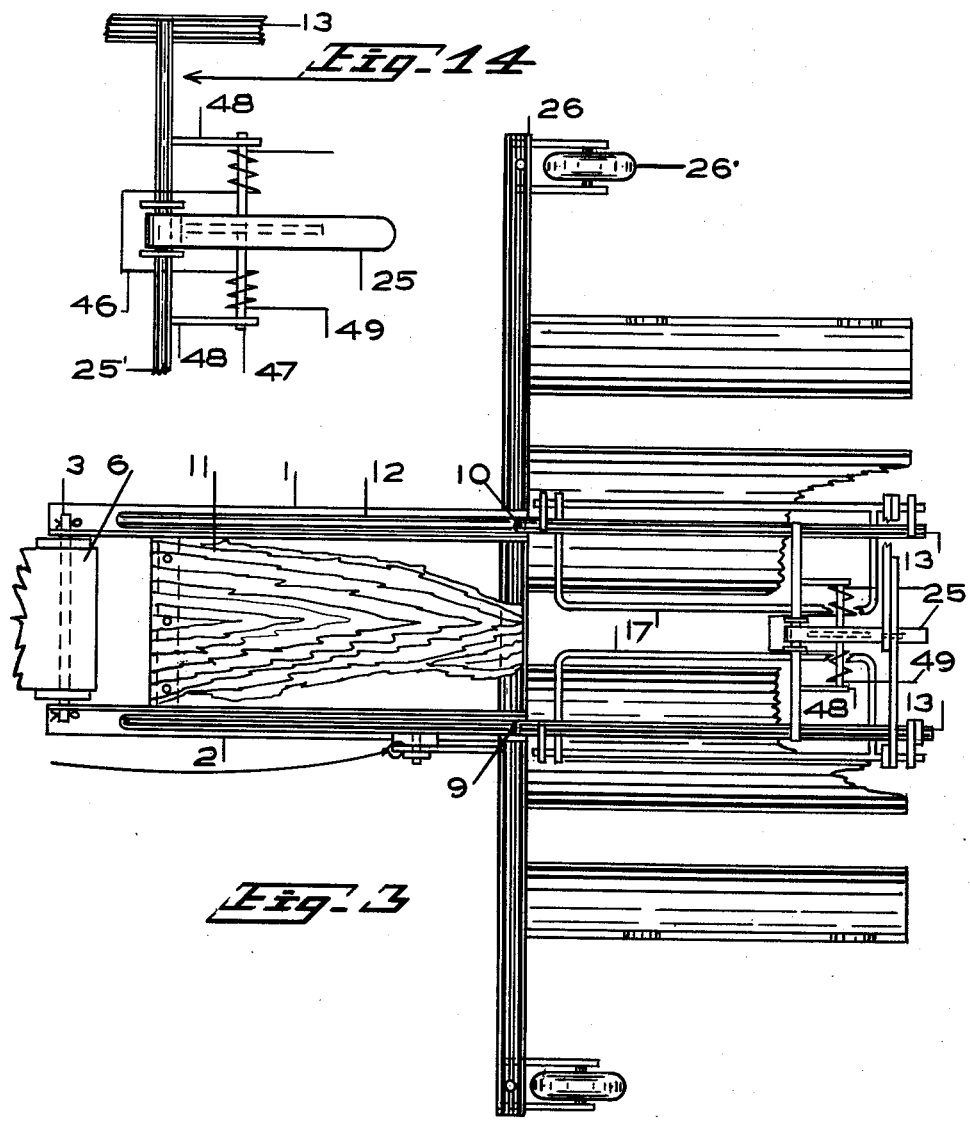

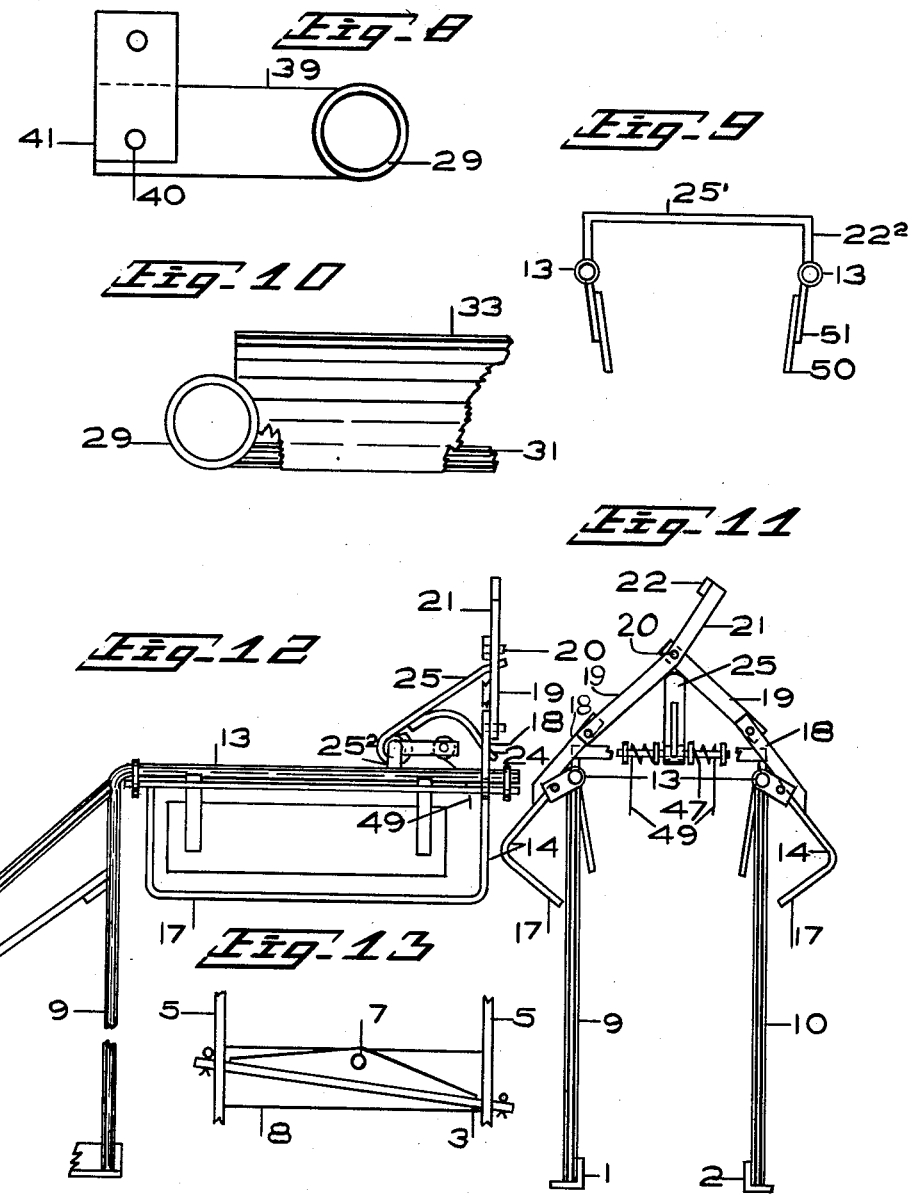

3,158,270
STOOKER FOR TRAVELING BALER
Wilfred Prentice, Assiniboia, Saskatchewan, Canada
Filed May 15, 1962, Ser. No. 194,915
5 Claims. (Cl. 214—6)

This invention relates to bale stookers for attachment in following relation to a traveling baler.

In the art to which the invention relates a traveling baler discharges the bales formed therein rearwardly on the ground from a bale chamber.

The present device provides a stooker for attachment in relation to the baler to receive the bales from the bale chamber of the baler and automatically stack the bales in a pyramid on a carrier from which the bales are discharged in a pile on the ground. The carrier is normally held horizontally disposed while the bale pile is formed, and is locked in this position to be manually releasable when the bale pile is completed on the carrier.

The carrier when loaded holds a six bale pyramid. Each bale as it is discharged from the baler is received on bale trip arms on to which the bale is pushed by following bales discharging from the baler; the bale when fully supported on the trip arms kicks an automatic release allowing the bale to drop on the carrier, and a counterweight restores the trip arms to a bale receiving position ready for the next bale.

The carrier when empty is elevated by spring means into a horizontal bale receiving position and engaged by locking means that require to be manually released to allow the carrier to tilt rearwardly downward under the weight of a pile of bales on the carrier and allow the pile to slide off on to the ground.

The stooker also includes means of attachment to the baler allowing the baler and stooker to tilt laterally in relation to each other when passing over uneven ground.

Other features and advantages of the invention will become apparent by reference to the accompanying description taken in conjunction with the drawings.

In the drawings, wherein is illustrated a preferred embodiment of the invention, FIG. 1 is a side elevation of the stooker shown in attachment to a traveling baler, of which latter a fragment only is shown, and illustrating in phantom the movement of bales from the bale chamber up the inclined runway of the stooker, the bale carrier being shown in a horizontal bale receiving position.

FIG. 2 is a side view showing the bale carrier and its attachment to the stooker frame, with the carrier illustrated as tilted rearwardly downward as it would be in discharging a pile of bales.

FIG. 3 is a top plan view of a bale stooker in accordance with my invention shown attached in following relation to a baler, a fragment of the bale chamber of which latter is shown, the stooker being shown in part broken away.

FIG. 4 is a rear end view of the bale stooker, shown in position to receive bales from the baler.

FIG. 5 shows an end view of a bale pile in pyramid form on the ground, as it would appear after discharge from the carrier.

FIG. 6 is a rear end view of the carrier, shown in parts as broken away, and on which is shown a pile of bales as it would appear when ready for discharge of the pile from the carrier, the showing including a fragment of the stooker axle bar.

FIG. 7 is a side view in perspective showing a fragment of an upright of the stooker, and a trip arm mounted thereon shown in bale receiving position.

FIG. 8 is an enlarged end view of the axle bar for the stooker, and including the load control arm and locking bracket.

FIG. 9 is a rear end view of the horizontal portions of the uprights of the stooker, including the cross rod for mounting the automatic trip and the bale guide plates.

FIG. 10 is an enlarged side view of a fragment of the bale carrier, showing an end of the carrier frame bar with a fragment of a carrier bale support rod and bale holding plate.

FIG. 11 is a rear end view of the stooker elevated bale piling frame and main frame bars, showing the automatic bale trip mechanism released and the trip arms in position for discharging a bale on to the carrier.

FIG. 12 is a side view of the elevated bale piling frame, including fragments of a main frame bar and the inclined runway, shown with the trip arms and trip mechanism released.

FIG. 13 is a view from the front of the stooker showing the mounting for attachment of the stooker on to the baler, illustrating how the stooker may tilt laterally in relation to the baler.

FIG. 14 is an enlarged top view of the trip lever for the trip mechanism, including fragments of the mounting bar for the trip lever and the trip locking bar, and showing the spring guides for the bales.

Having reference to the drawings, the bale stooker includes horizontal side frame bars 1 and 2 (FIGS. 1 and 3) attachable on a rod 3 mounted vertically slidable in slots 4 of brackets 5 attached one to each side of the bale chamber 6 of a traveling baler, the rod 3 pivoting at 7 (FIG. 13) on a cross bar 8 fixed to the brackets 5, by which the stooker and baler may tilt laterally in relation to each other.

The frame bars 1 and 2 have fixed thereon uprights 9 and 10 of an elevated frame in which bales received from the baler are deposited, an inclined runway 11 leading from the bale chamber for delivery of the bales from the baler, the runway having side arms 12.

The uprights 9 and 10 include parallel horizontal portions 13 (FIG. 7) from each of which is suspended a trip arm 14, the trip arms including rods 15 free to turn in bracket arms 16 fixed to the horizontal portions 13 of the uprights. These trip arms include horizontal portions 17 inwardly turned and on which bales discharged from the inclined runway 11 are received.

The trip arms are normally held with their horizontal portions 17 in bale receiving position by a trip mechanism (FIGS. 1, 4, 11 and 12) including arms 18 fixed to the trip arms extending upwardly and to which pivotally attach locking arms 19 that pivotally connect at 20, the one of these locking arms including an extension 21 with counterweight 22 that is adaped to normally hold the trip arms in bale receiving position, as shown in FIGURE 14, and in FIGURES 1, 3 and 4, with the locking bar 25 and its depending arm 24 in position to be tripped by an oncoming bale.

A bale discharging up the inclined runway 11, such as the bale indicated at 23 in FIGURE 1, is pushed by following bales on to the horizontal portions 17 of the trip arms, until when wholly supported by the trip arms the bale kicks against a downwardly inclined arm 24 of a trip bar 25 mounted on a cross rod 25' supported on upright arms 25² on the sections 13 of the uprights 9 and 10. The trip bar 25 engages the locking arms 19 at their pivotal connection 20. This, through the arms 18, pivots the trip arms 14 outward (FIG. 11) allowing the bale to drop.

On release of the trip arms 14 by the bale the counterweight 22 restores the trip arms to their bale receiving position, as shown in FIGURES 3 and 4.

The stooker frame side bars 1 and 2, as shown in FIGURES 1 and 6, are rearwardly supported on a tubular axle bar 26 (FIGS. 1 and 3) carried on castor wheels 26' mounted in forked arms 27 attached by pins 28 to the axle bar and the frame side bars 1 and 2.

The carrier for the bales includes a cross frame bar 29 suspended from the axle bar 26 by straps 30. To the frame bar 29 attaches bale support rods 31 (FIGS. 4 and 10) projecting rearwardly parallel with each other and on which are intermediate inverted V-shaped guide guide plates 22 and side guide plates 33 forming a cradle in which a row of three lower bales (FIG. 6) of a pile of bales 34 may rest with longitudinal edges of the bales downward. The side plates 33 include guide arms 35. The carrier is held normally in bale receiving position by a spring 36 attaching to an intermediate rod 31 by an eye bolt 37 and to the upright 9 by an eye bolt 38.

For locking the carrier in a horizontal bale receiving position an arm 39 (FIGS. 1 and 2) is fixed to the carrier cross bar 29 projecting forwardly, and on this is pivotally attached by a bolt 40 (FIGS. 1 and 8) a locking plate 41 to which is pivotally attached by a bolt 41' a lever 42 that is pivoted at 43 to the frame side bar 1. The lever 42 is normally held by a spring 44, attaching to the lever and to the upright 9 in any suitable manner, in a position shown in FIGURE 1 aligned vertically with the locking plate 41 holding the carrier in a horizontal bale receiving position. To the lever 42 is attached a cable 45 by which the operator of the baler may pull forward on the lever (FIG. 2) allowing the carrier under weight of a load of bales to tilt rearwardly downward for discharge of the bales.

For restraining bales as they are discharged from the runway 11 on to the horizontal portions 17 of the trip arms, a spring arm 46 (FIG. 14) is spirally wound on a rod 47 carried by arms 48 fixed to the rod 25' and this spring arm includes tines 49 curved rearwardly downward to engage and hold the bale on the trip arms.

There are also provided guide plates 50 for the bales (FIGS. 1 and 9) suspended from the horizontal portions 13 of the uprights 9 and 10 by arms 51 fixed to the guide plates and to the portions 13. The trip arms 14 are held by stops, as at 52 (FIG. 1) against moving too far inward.

In the use of the device bales discharging from the bale chamber 6 are pushed by succeeding bales up the runway 11 and on to the horizontal portions 17 in succession to be supported by the trip arms 14.

As a bale is pushed along the horizontal portions of the trip arms it encounters the arm 24 on the trip bar 25 and pushes up on the trip bar, the trip bar engaging the locking arms 19 pulls outward on the trip arms 14, as shown in FIGURE 11, releasing the bale to drop on the carrier. As the bale drops from the trip arms the counterweight 22 moves the trip arms back into the position shown in FIGURES 1 and 4 ready for the next bale.

The first bale falls into the center section 53 (FIG. 6) of the carrier. The next following bale slides off the first bale on the carrier and into an adjoining section of the carrier, as indicated at 54. The remaining bales slide in succession into the section 55 and the sections created by the bales, forming a six bale pyramid. When the pyramid is complete the pile of bales may be slid off the carrier and on to the ground in a pile as shown in FIGURE 5. For this the cable 45 is pulled by the baler operator drawing the lever 42 forward and allowing the carrier to tilt rearwardly downward, as shown in FIGURE 2, and the bales slide off on to the ground.

When the pile of bales is discharged the spring 36 pulls the carrier up to a horizontal position, and the spring 44 moves the lever 42 into a vertical position aligned with the plate 41 and held locked by the pressure of the new pile of bales weighing down the carrier.

The pile of bales on the ground (FIG. 5) has slanting sides to the weather and is open for ventilation underneath.

What I claim and wish to secure by Letters Patent is:

1. In a bale stooker for attachment in following relation to a traveling baler, the stooker having a carrier for receiving bales, the carrier including a forward cross frame bar and bale guide plates mounted on the cross frame bar rearwardly extending for supporting a pile of bales thereon, means mounting the bale carrier attached to the rear end of the baler, said means comprising a pair of side frame bars forwardly pivotally attached to the baler one to each side thereof and extending rearwardly, a tubular axle bar transversely attached in rearward supporting relation to the side frame bars, castor wheels mounted in forked arms, pins attaching the forked arms in supporting relation to the axle bar, and straps in the form of loops engaging the axle bar and the carrier cross frame bar suspending said cross frame bar from the axle bar parallel therewith and free to swing forward and backward.

2. In a bale stooker as set out in claim 1, the stooker including a rearward upwardly inclined chute for receiving bales from the baler and delivering the bales for deposit on the carrier, said chute being rearwardly supported on a pair of uprights, means receiving the bales from the chute and supporting the bales for discharge one by one on to the carrier, said means comprising parallel horizontal rearwardly extending integral arms on the upper ends of the uprights and between which the bales from the chute discharge, and a pair of opposing trip arms pivotally carried on the horizontal arms, said trip arms having inwardly turned portions combining to provide a horizontal support for a bale thereon when the trip arms are moved inwardly pivoting on the horizontal arms and to release the bale for discharge horizontally on to the carrier when the trip arms are moved outwardly pivoting on the horizontal arms.

3. A bale stooker as set out in claim 1 and in which the pivotal attachment of the stooker frame side bars to the baler comprise depending plates fixed to the baler, one to each side, said plates having vertical slots therein, a transverse rod mounted in the slots free to move up and down therein, a cross bar fixed to the side plates, and means on the cross bar pivotally engaging the rod equi-distant the ends thereof.

4. In a bale stooker as set out in claim 1, means connecting the carrier and frame side bars with the carrier engageable thereby in a horizontal bale receiving position and disengageable to pivot rearwardly downward and discharge a load of bales therefrom, said means comprising an arm fixed to the carrier cross bar forwardly extending, a lever in the form of a bar intermediately pivoted on one of the frame side bars vertically aligned with said arm, a locking plate pivotally attached to the forward end of said arm and to the lower end of the lever, said plate being adapted when the lever is vertically disposed to extend vertically between the lever and the cross frame bar and to hold said arm with the carrier locked thereby in bale receiving position.

5. In a stooker for attachment in following relation to a traveling baler, said stooker having a carrier for receiving bales and frame bars for pivotal attachment of the stooker to the baler, and including an axle bar with castor wheels mounted thereon rearwardly supporting the side frame bars and means pivotally attaching the carrier to the axle bar, means for delivering bales discharged from the baler to the carrier, said means including uprights on the frame bars, said uprights having rearwardly extending horizontal portions, the carrier having spring means engaging the uprights supporting the carrier in a horizontal bale receiving position, an inclined runway mounted on the frame bars and uprights and along which bales discharging from the baler are pushed by the pressure of discharging bales, pivotally mounted trip arms on the horizontal portions of the uprights, said trip arms having inwardly turned portions on which a bale discharging from the runway is delivered when the inwardly turned portions of the arms are horizontally disposed, and locking means on the horizontal portions of the uprights engaging the trip arms and normally holding the trip arms with their inwardly turned portions in bale receiving position, said locking means being releasable to permit discharge of the bale from the trip arms, and said locking means include arms fixed to the trip arms extending upwardly, locking arms pivoted to the upwardly extending arms and to each other, one of said locking arms including an extension and a counterweight on the extension normally holding said arms with the inwardly turned portions of the trip arms horizontally disposed, a locking bar and means pivotally mounting the locking bar on the horizontal portions of the upright, said locking bar having an arm depending in the path of a bale discharging on to the trip arm horizontal portions to be moved upwardly by said bale and engage the locking arms to move the trip arms outwardly allowing the bale to slide off the inwardly turned portions of the trip arms and drop on to the carrier.

References Cited by the Examiner
UNITED STATES PATENTS

| | | | |
|---|---|---|---|
| 1,373,000 | 3/21 | Gilbert et al. | 219—17 |
| 2,660,855 | 12/53 | Voight | 56—473.5 |
| 2,727,352 | 12/55 | Jones | 56—473.5 |
| 2,740,250 | 4/56 | Olson et al. | 214—9 |
| 2,746,770 | 5/56 | Soreson | 280—460 |
| 2,799,129 | 7/57 | Huntley et al. | 56—473.5 |
| 2,845,770 | 8/58 | Fessler | 56—473.5 |
| 2,901,128 | 8/59 | Barski. | |
| 2,948,420 | 8/60 | Stoecker | 56—473.5 |

HUGO O. SCHULZ, *Primary Examiner.*

MORRIS TEMIN, *Examiner.*